US012633108B2

(12) United States Patent
Deshpande et al.

(10) Patent No.: US 12,633,108 B2
(45) Date of Patent: May 19, 2026

(54) METHOD AND SYSTEM FOR DOMAIN AWARE SEMI-SUPERVISED LEARNING

(71) Applicant: Tata Consultancy Services Limited, Mumbai (IN)

(72) Inventors: Shailesh Shankar Deshpande, Pune (IN); Chaman Banolia, Pune (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 229 days.

(21) Appl. No.: 18/751,810

(22) Filed: Jun. 24, 2024

(65) Prior Publication Data

US 2025/0022266 A1      Jan. 16, 2025

(30) Foreign Application Priority Data

Jul. 14, 2023      (IN) .............................. 202321047615

(51) Int. Cl.
G06V 10/82 (2022.01)
G06V 10/58 (2022.01)
G06V 10/77 (2022.01)

(52) U.S. Cl.
CPC .............. G06V 10/82 (2022.01); G06V 10/58 (2022.01); G06V 10/7715 (2022.01)

(58) Field of Classification Search
None
See application file for complete search history.

(56) References Cited

U.S. PATENT DOCUMENTS

| | | | |
|---|---|---|---|
| 11,386,298 B2 | 7/2022 | Sedai et al. | |
| 2021/0357698 A1 | 11/2021 | Murasaki | |
| 2022/0415022 A1* | 12/2022 | Brumby | .............. G06V 10/774 |

FOREIGN PATENT DOCUMENTS

| | | | | |
|---|---|---|---|---|
| AU | 2021101584 A4 * | 12/2022 | .......... | G06F 18/2411 |
| CN | 107122708 A * | 9/2017 | ............. | G06N 3/045 |

(Continued)

OTHER PUBLICATIONS

X. Zhao, M. Zhang, R. Tao, W. Li, W. Liao and W. Philips, "Multisource Cross-Scene Classification Using Fractional Fusion and Spatial-Spectral Domain Adaptation," IGARSS 2022—2022 IEEE International Geoscience and Remote Sensing Symposium, Kuala Lumpur, Malaysia, 2022, pp. 699-702. (Year: 2022).*

(Continued)

*Primary Examiner* — David Ometz
(74) *Attorney, Agent, or Firm* — FINNEGAN, HENDERSON, FARABOW, GARRETT & DUNNER, LLP

(57) ABSTRACT

Classification of images is inherently a semi-supervised classification problem. Often, the labeled pixels and the unlabeled pixels in the image may have different distribution. Hence classification accuracy of such images is affected. The present disclosure proposes an umbrella framework for semi-supervised learning that considers the domains shifts in labeled and unlabeled pixels. The method proposed a two way optimization solution using deep learning models based on spectral features, spatial features, and fused spectral-spatial features. The model is trained in such a way that it is not only trained on the correct class of pixel but also on the source category of the pixel, for example, labeled pixel or unlabeled pixel. The error in the pixel class is minimized, whereas the error in the source category is encouraged simultaneously.

9 Claims, 3 Drawing Sheets

(56) References Cited

FOREIGN PATENT DOCUMENTS

| | | | | |
|---|---|---|---|---|
| CN | 110852227 A | * | 2/2022 | .............. G06N 3/08 |
| CN | 114821198 A | * | 7/2022 | ............. G06N 3/045 |

OTHER PUBLICATIONS

M. Ahmad et al., "Hyperspectral Image Classification-Traditional to Deep Models: A Survey for Future Prospects," in IEEE Journal of Selected Topics in Applied Earth Observations and Remote Sensing, vol. 15, pp. 968-999, 2022. (Year: 2022).*

Y. Zhang, C. P. Huynh and K. N. Ngan, "Feature Fusion With Predictive Weighting for Spectral Image Classification and Segmentation," in IEEE Transactions on Geoscience and Remote Sensing, vol. 57, No. 9, pp. 6792-6807, Sep. 2019. (Year: 2019).*

L. Zhang, Q. Zhang, B. Du, X. Huang, Y. Y. Tang and D. Tao, "Simultaneous Spectral-Spatial Feature Selection and Extraction for Hyperspectral Images," in IEEE Transactions on Cybernetics, vol. 48, No. 1, pp. 16-28, Jan. 2018. (Year: 2018).*

S. Jia et al., "A Lightweight Convolutional Neural Network for Hyperspectral Image Classification," in IEEE Transactions on Geoscience and Remote Sensing, vol. 59, No. 5, pp. 4150-4163, May 2021. (Year: 2021).*

J. Yang, Y.-Q. Zhao and J. C.-W. Chan, "Learning and Transferring Deep Joint Spectral-Spatial Features for Hyperspectral Classification," in IEEE Transactions on Geoscience and Remote Sensing, vol. 55, No. 8, pp. 4729-4742, Aug. 2017. (Year: 2017).*

Wenkai Li et al., "A Positive and Unlabeled Learning Algorithm for One-Class Classification of Remote-Sensing Data," IEEE Transactions on Geoscience and Remote Sensing, 2010 vol. 49; Issue: 2, MDPI, https://faculty.ucmerced.edu/qguo/publications/igrass_pul.pdf.

* cited by examiner

100

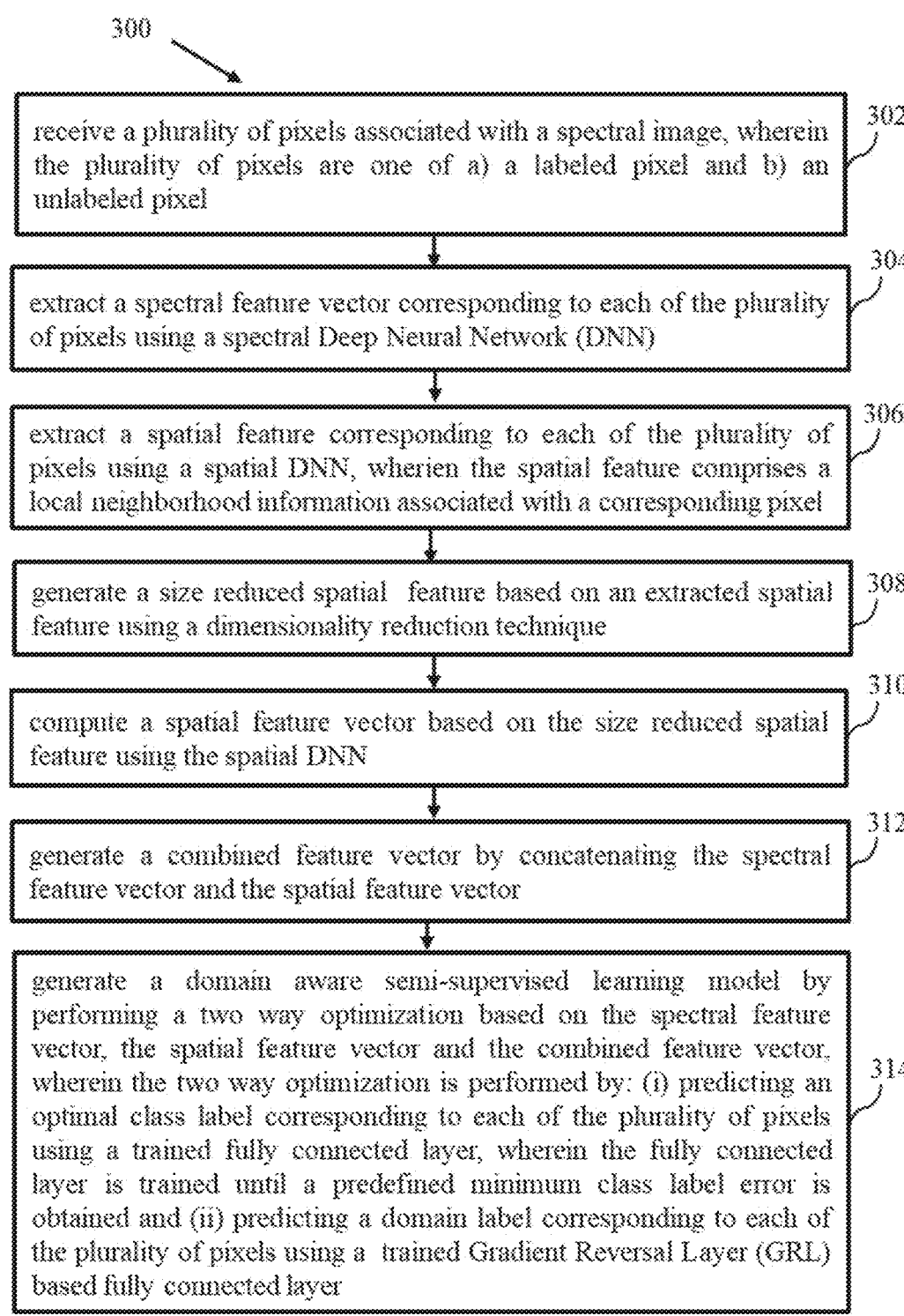

300 receive a plurality of pixels associated with a spectral image, wherein the plurality of pixels are one of a) a labeled pixel and b) an unlabeled pixel

302 extract a spectral feature vector corresponding to each of the plurality of pixels using a spectral Deep Neural Network (DNN)

304 extract a spatial feature corresponding to each of the plurality of pixels using a spatial DNN, wherien the spatial feature comprises a local neighborhood information associated with a corresponding pixel

306 generate a size reduced spatial feature based on an extracted spatial feature using a dimensionality reduction technique

308 compute a spatial feature vector based on the size reduced spatial feature using the spatial DNN

310 generate a combined feature vector by concatenating the spectral feature vector and the spatial feature vector

312 generate a domain aware semi-supervised learning model by performing a two way optimization based on the spectral feature vector, the spatial feature vector and the combined feature vector, wherein the two way optimization is performed by: (i) predicting an optimal class label corresponding to each of the plurality of pixels using a trained fully connected layer, wherein the fully connected layer is trained until a predefined minimum class label error is obtained and (ii) predicting a domain label corresponding to each of the plurality of pixels using a trained Gradient Reversal Layer (GRL) based fully connected layer

METHOD AND SYSTEM FOR DOMAIN AWARE SEMI-SUPERVISED LEARNING

PRIORITY CLAIM

This U.S. patent application claims priority under 35 U.S.C. § 119 to: India application No. 202321047615, filed on Jul. 14, 2023. The entire contents of the aforementioned application are incorporated herein by reference.

TECHNICAL FIELD

The disclosure herein generally relates to the field of Machine Learning (ML) and, more particularly, to a method and system for domain aware semi-supervised learning.

BACKGROUND

Classification of images is inherently a transductive semi-supervised problem. The learned model must label all the pixels in the image, given a few annotated pixels in the same image. Generally, the classification of a single image is sufficient. However, in case of multi-date or multi-location data is to be processed, it is preferred to mark the training area in each image separately. This is because of the variations in the feature distribution of the classes across the different dates. Semi-supervised learning is a well-researched area in hyperspectral image processing. Especially, the various strategies for pseudo-labeling have been exploited recently. For example, Multi-nominal Logistic Regression (MLR), Soft-MLR (SMLR) for pseudo-labeling and unmixing for pseudo-labeling are used recently.

Some of the conventional approaches for semi-supervised learning performs self-learning iterations. Each self-training iteration begins with building a model using the initial set of training pixels and labeling all the unlabeled pixels using that model. Next, the pixels with high-confidence class assignments from the first iteration are added to the initial training data and then the new model is built. Multiple such iterations are performed till accuracy converges. However, the problem in this approach is that the remote sensing images (hyperspectral images) often cover large area and hence the labeled pixels and the unlabeled pixels may follow different distribution. The problem of the distribution variations is called as a data shift or domain shift problem. Thus, the learner needs to consider the possible differences in the distribution of labeled and unlabeled pixels for better classification of unlabeled pixels. This is not attended so far in the past research.

SUMMARY

Embodiments of the present disclosure present technological improvements as solutions to one or more of the above-mentioned technical problems recognized by the inventors in conventional systems. For example, in one embodiment, a method for domain aware semi-supervised learning is provided. The method includes receiving, by one or more hardware processors, a plurality of pixels associated with a spectral image, wherein the plurality of pixels are one of a) a labeled pixel and b) an unlabeled pixel. Further, the method includes extracting via the one or more hardware processors, a spectral feature vector corresponding to each of the plurality of pixels using a spectral Deep Neural Network (DNN). Furthermore, the method includes extracting via the one or more hardware processors, a spatial feature corresponding to each of the plurality of pixels using the spatial DNN, wherein the spatial feature comprises a local neighborhood information associated with a corresponding pixel. Furthermore, the method includes generating via one or more hardware processors, a size reduced spatial feature based on the extracted spatial feature using a dimensionality reduction technique. Furthermore, the method includes computing via one or more hardware processors, a spatial feature vector based on the size reduced spatial feature using the spatial DNN. Furthermore, the method includes generating via one or more hardware processors, a combined feature vector by concatenating the spectral feature vector and the spatial feature vector. Finally, the method includes generating via one or more hardware processors, a domain aware semi-supervised learning model by performing a two way optimization based on the spectral feature vector, the spatial feature vector and the combined feature vector, wherein the two way optimization is performed by (i) predicting an optimal class label corresponding to each of the plurality of pixels using a trained fully connected layer, wherein the fully connected layer is trained until a predefined minimum class label error is obtained and (ii) predicting a domain label corresponding to each of the plurality of pixels using a trained Gradient Reversal Layer (GRL) based fully connected layer, wherein the GRL based fully connected layer is trained until a predefined maximum domain label error is obtained, wherein the gradient of the feature vector is reversed before inputting to the fully connected layer.

In another aspect, a system for domain aware semi-supervised learning is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a plurality of pixels associated with a spectral image, wherein the plurality of pixels are one of a) a labeled pixel and b) an unlabeled pixel. Further, the one or more hardware processors are configured by the programmed instructions to extract a spectral feature vector corresponding to each of the plurality of pixels using a spectral Deep Neural Network (DNN). Furthermore, the one or more hardware processors are configured by the programmed instructions to extract a spatial feature corresponding to each of the plurality of pixels using the spatial DNN, wherein the spatial feature comprises a local neighborhood information associated with a corresponding pixel. Furthermore, the one or more hardware processors are configured by the programmed instructions to generate a size reduced spatial feature based on the extracted spatial feature using a dimensionality reduction technique. Furthermore, the one or more hardware processors are configured by the programmed instructions to compute a spatial feature vector based on the size reduced spatial feature using the spatial DNN. Furthermore, the one or more hardware processors are configured by the programmed instructions to generate a combined feature vector by concatenating the spectral feature vector and the spatial feature vector. Finally, the one or more hardware processors are configured by the programmed instructions to generate a domain aware semi-supervised learning model by performing a two way optimization based on the spectral feature vector, the spatial feature vector and the combined feature vector, wherein the two way optimization is performed by (i) predicting an optimal class label corresponding to each of the plurality of pixels using a trained fully connected layer, wherein the fully connected layer is trained until a predefined minimum class label error is obtained and (ii)

predicting a domain label corresponding to each of the plurality of pixels using a trained Gradient Reversal Layer (GRL) based fully connected layer, wherein the GRL based fully connected layer is trained until a predefined maximum domain label error is obtained, wherein the gradient of the feature vector is reversed before inputting to the fully connected layer.

In yet another aspect, a computer program product including a non-transitory computer-readable medium having embodied therein a computer program for domain aware semi-supervised learning is provided. The computer readable program, when executed on a computing device, causes the computing device to receive a plurality of pixels associated with a spectral image, wherein the plurality of pixels are one of a) a labeled pixel and b) an unlabeled pixel. Further, the computer readable program, when executed on a computing device, causes the computing device to extract a spectral feature vector corresponding to each of the plurality of pixels using a spectral Deep Neural Network (DNN). Furthermore, the computer readable program, when executed on a computing device, causes the computing device to extract a spatial feature corresponding to each of the plurality of pixels using the spatial DNN, wherein the spatial feature comprises a local neighborhood information associated with a corresponding pixel. Furthermore, the computer readable program, when executed on a computing device, causes the computing device to generate a size reduced spatial feature based on the extracted spatial feature using a dimensionality reduction technique. Furthermore, the computer readable program, when executed on a computing device, causes the computing device to compute a spatial feature vector based on the size reduced spatial feature using the spatial DNN. Furthermore, the computer readable program, when executed on a computing device, causes the computing device to generate a combined feature vector by concatenating the spectral feature vector and the spatial feature vector. Finally, computer readable program, when executed on a computing device, causes the computing device to generate a domain aware semi-supervised learning model by performing a two way optimization based on the spectral feature vector, the spatial feature vector and the combined feature vector, wherein the two way optimization is performed by (i) predicting an optimal class label corresponding to each of the plurality of pixels using a trained fully connected layer, wherein the fully connected layer is trained until a predefined minimum class label error is obtained and (ii) predicting a domain label corresponding to each of the plurality of pixels using a trained Gradient Reversal Layer (GRL) based fully connected layer, wherein the GRL based fully connected layer is trained until a predefined maximum domain label error is obtained, wherein the gradient of the feature vector is reversed before inputting to the fully connected layer.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is an exemplary flow diagram illustrating a processor implemented method for domain aware semi-supervised learning implemented by the system of FIG. 1 according to some embodiments of the present disclosure.

DETAILED DESCRIPTION

Figure 1:
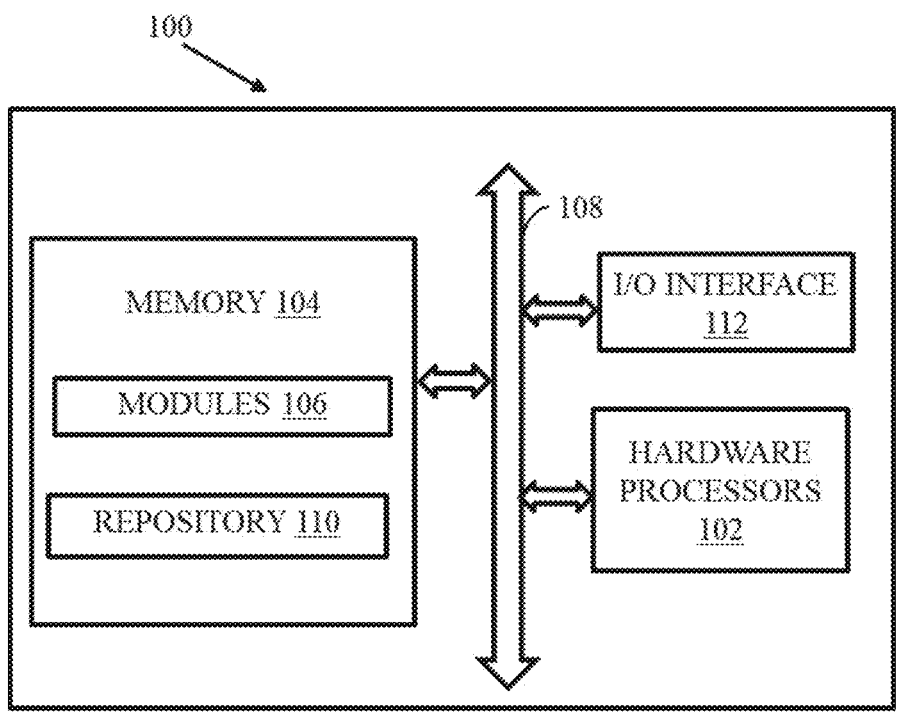
FIG. 1 is a functional block diagram of a system for domain aware semi-supervised learning, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Classification of remotely sensed data is inherently a transductive semi-supervised problem. The learned model must label all the pixels in the image given a few annotated pixels in the same image. Semi-supervised learning is a well-researched area in hyperspectral image processing. Especially the various strategies for pseudo-labeling have been exploited recently. For example, Multi-nominal Logistic Regression (MLR), Soft-MLR (SMLR) for pseudo-labeling and unmixing for pseudo-labeling are used recently.

Some of the conventional approaches for semi-supervised learning performs self-learning iterations. Each self-training iteration begins with building a model using the initial set of training pixels and labeling all the unlabeled pixels using that model. Next, the pixels with high-confidence class assignments from the first iteration are added to the initial training data and then the new model is built. Multiple such iterations are performed till accuracy converges. However, the problem in this approach is that the remote sensing images often cover large area and hence the labeled pixels and the unlabeled pixels may follow different distribution. The problem of the distribution variations is called as a data shift or domain shift problem. Thus, the learner needs to consider the possible differences in the distribution of labeled and unlabeled pixels for better classification of unlabeled pixels. This is not attended so far in the past research.

To overcome the challenges of the conventional approaches, embodiments herein provide a method and system for domain aware semi-supervised learning. The present disclosure provides a two way optimization solution for pixel labeling using deep learning models. The present disclosure includes a learner that considers the distribution differences in labeled and unlabeled pixels. That is, the distribution shift between the labeled pixels and unlabeled pixels within the image is considered. Thus, the self-training iteration of the conventional approaches were replaced with a single iteration which is enabled with domain adaptation. The model is trained in such a way that it is not only trained on the correct class of pixel but also on the source category of the pixel, for example, labeled pixel or unlabeled pixel. The error in the pixel class is minimized, whereas the error in the source category is encouraged simultaneously. This two way optimization leads to a model which is invariant of the input pixel source category and thus adapts to the domains well.

The present disclosure processes spectral and spatial inputs. The spatial features are processed by Visual Geometry Group (VGG) based Deep Neural Network (DNN) and the spectral inputs are processed by a multi-layer perceptron neural network (MLP). The extracted spectral and spatial features are combined to form a common feature vector. This feature vector is used for land cover classification and for the pixel source category (labeled and unlabeled) classification. For example, for obtaining the domain adaptation, the weights of the DNNs are learned in such a manner that it classifies the pixel correctly irrespective of any source. The main contribution of the present disclosure is to devise a new semi-supervised approach which considers the difference of distributions in labeled and unlabeled data to improve the accuracy. Thus, the proposed method is higher level umbrella framework for semi-supervised learning where unlabeled and labeled data may have distribution shifts.

Figure 2:
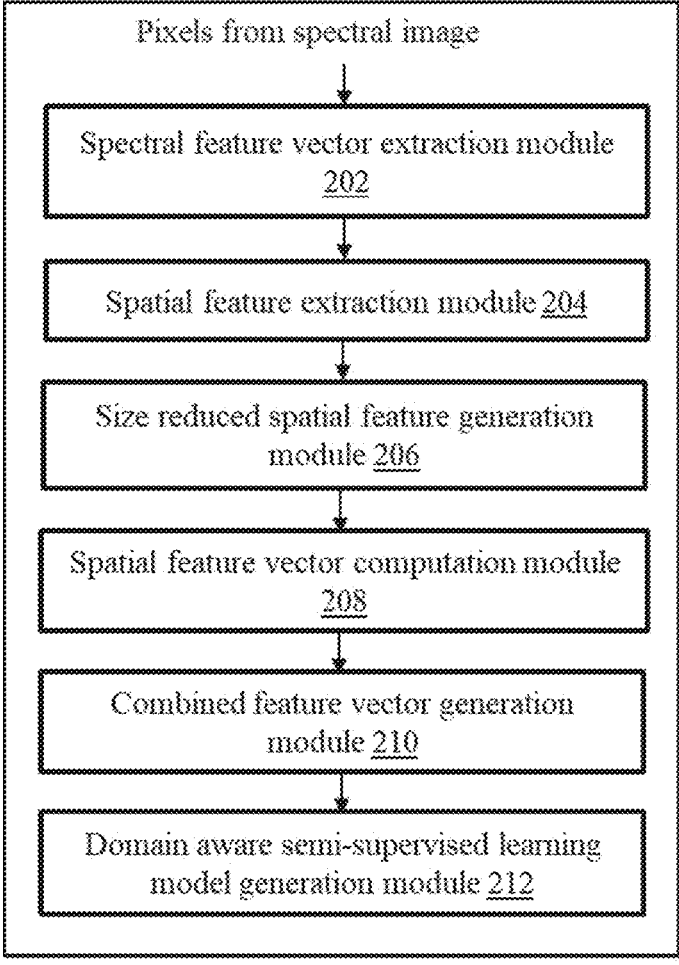
FIG. 2 illustrates a functional architecture of the system of FIG. 1, for domain aware semi-supervised learning, in accordance with some embodiments of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 is a functional block diagram of a system 100 for domain aware semi-supervised learning, in accordance with some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

The plurality of modules 106 include programs or coded instructions that supplement applications or functions performed by the system 100 for domain aware semi-supervised learning. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for domain aware semi-supervised learning. In an embodiment, the modules 106 include a spectral feature vector extraction module 202 (shown in FIG. 2), a spatial feature extraction module 204 (shown in FIG. 2), a size reduced spatial feature generation module 206 (shown in FIG. 2), a spatial feature vector computation module 208 (shown in FIG. 2), a combined feature vector generation module 210 (shown in FIG. 2) and a domain aware semi-supervised learning model generation module 212 (shown in FIG. 2). In an embodiment, FIG. 2 illustrates a functional architecture of the system of FIG. 1, for domain aware semi-supervised learning, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such an external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS).

FIG. 3 is an exemplary flow diagram illustrating a method 300 for domain aware semi-supervised learning implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 300 by the one or more hardware processors 102. The steps of the method 300 of the present disclosure will now be explained with reference to the components or blocks of the system 100 as depicted in FIG. 1 and the steps of flow diagram as depicted in FIG. 3. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

At step 302 of the method 300, the one or more hardware processors 102 are configured by the programmed instructions to receive a plurality of pixels associated with a spectral image, wherein the plurality of pixels are one of a) a labeled pixel and b) an unlabeled pixel. The spectral image is of n-dimensions, wherein 'n' indicates number of bands. In another embodiment, the one or more hardware processors 102 are configured by the programmed instructions to receive and process a plurality of pixels associated with a non-spectral color image.

At step 304 of the method 300, the spectral feature vector extraction module 202 executed by one or more hardware processors 102 is configured by the programmed instructions to extract a spectral feature vector corresponding to each of the plurality of pixels using a spectral Deep Neural Network (DNN).

For example, the architecture of the spectral DNN includes several layers. Specifically, the spectral DNN network includes a layer with 512 neurons in the first layer, followed by a layer with 1024 neurons, dropout layers, two layers with 2048 neurons, another dropout layer, and finally, two dense layers with 4096 hidden neurons, and a layer with 1000 neurons.

At step 306 of the method 300, the spatial feature extraction module 204 executed by the one or more hardware processors 102 is configured by the programmed instructions to extract a spatial feature corresponding to each of the plurality of pixels using a spatial DNN, wherein the spatial feature comprises a local neighborhood information associated with a corresponding pixel. The local neighborhood information is one of a) an image patch and b) a configurable window.

At step 308 of the method 300, the size reduced spatial feature generation module 206 executed by the one or more hardware processors 102 is configured by the programmed instructions to generating a size reduced spatial feature based on an extracted spatial feature using a dimensionality reduction technique. For example, the dimensionality is reduced by applying Principal Component Analysis (PCA) on the three dimensional image patch (or patch cube) centered around the pixel.

At step 310 of the method 300, the spatial feature vector computation module 208 executed by the one or more hardware processors 102 is configured by the programmed instructions to computing a spatial feature vector based on the size reduced spatial feature using the spatial DNN. For example, the spatial input is processed using the VGG16 architecture, resulting in a feature vector of 1000 values.

At step 312 of the method 300, the combined feature vector generation module 210 executed by the one or more hardware processors 102 is configured by the programmed instructions to generating a combined feature vector by concatenating the spectral feature vector and the spatial feature vector. For example, to combine the spatial and spectral feature vectors, the outputs of both architecture features are concatenated, which is then processed with two dense layers of 1000 neurons.

At step 314 of the method 300, the domain aware semi-supervised learning model generation module 212 executed by the one or more hardware processors 102 is configured by the programmed instructions to generate a domain aware semi-supervised learning model by performing a two way optimization based on the spectral feature vector, the spatial feature vector and the combined feature vector for making whole system ignorant of domain labels and for predicting correct class labels. The two way optimization is performed by (i) predicting an optimal class label corresponding to each of the plurality of pixels using a trained fully connected layer, wherein the fully connected layer is trained until a predefined minimum class label error is obtained, (for example, to classify pixel source) and (ii) predicting a domain label corresponding to each of the plurality of pixels using a trained Gradient Reversal Layer (GRL) based fully connected layer (for example, to distinguish between samples from labeled and unlabeled domains), wherein the GRL based fully connected layer is trained until a predefined maximum domain label error is obtained with a, wherein the gradient of the feature vector is reversed before inputting to the fully connected layer. The domain label indicates one of a) labeled pixel and b) an unlabeled pixel.

Experimentation Details:

The present disclosure is experimented as follows: The present disclosure has been trained and tested using publicly available Pavia University dataset. Pavia data is collected using a airborne optical sensor, ROSIS-3 over the Pavia University in Italy. The spatial resolution of the image was 1.3 m and has spectral coverage from 430 to 860 nm with 103 spectral bands. The image has 610×340 pixels and ground truth have 9 classes including the asphalt, meadows, gravel, trees, metal sheet, bare soil, bitumen, brick, and shadow.

Multiple experiments were conducted on the Pavia data to compare the performance between the present disclosure and self-learning iterations by SVM and VGG-16 based neural network (called CNN). The pixels in the image were split into two sets, training, and testing (called L1 and L2 respectively). L2 is assumed to be the unlabeled pixels and their land cover labels were not used, only source labels were used. Spectral, spatial, and spectral-spatial features were considered for classification using all three models. Spectral features are band values of a target pixel, spatial features are the features extracted from the local neighborhood around the pixel including the pixel, and spectral-spatial are fused features. The extent of local neighborhood considered during convolution determines the spatial features extracted for the target pixel. Hence to study the effect of local neighborhood on the classification accuracy in spatial, and spectral-spatial experiments Different window sizes starting from 11 and ending at 40 were considered for experimentation. The window sizes considered were 5, 7, 9, 11, 15, 20, 25, 30, 40. The training and testing experiments were repeated for each window size.

The intuition in conducting these experiments was: if the hypothesis of domain shift between labeled and unlabeled pixels is true, then for a given model the proposed method should provide better accuracy as compared to the first self-training iteration. The advantages would be reflected in higher levels of iterations as well. However, at a particular $n^{th}$ iteration the accuracy levels may match the proposed method, that is, domain aware approach.

It has been observed that the present disclosure improved the accuracy on L2 by 1% 5% 3% for spectral, spatial (5×5), and spectral-spatial (5×5) features respectively, as compared to the first iteration of self-training. Best accuracy by our approach with spatial features was 91.77% for window size of 11×11 and was improvement by ~2% over self-training iterations by SVM. The best spectral spatial accuracy by our approach was 95.88% which was more by ~3%, for same window size 30×30. Results by our approach were better than the first iteration results by CNN self-learning by –1% 4% 4% for spectral, spatial, and spectral-spatial features respectively. Best accuracies for spatial, and spectral-spatial features were better than SVM results achieved after complete iterations for the same window size (91.77% vs. 89.19%; 95.88% vs. 89.08%).

Further, when the results of spectral and spatial features for CNN are compared, then the improvements in the accuracies because of the proposed method are more pronounced for spatial features. This indicates the distribution shifts for spatial features is more pronounced than its spectral counterpart. This is intuitive as the urban materials within the scene are likely to have less variety. On the other hand, spatial arrangement of the land covers would vary more according to the location. Though this observation may hold true in most of the cases, further investigation is required to evaluate how generic the observation is. The spatial resolution of the data set used for experiments is high. Experiments with moderate resolution image not having dominant spatial features would be helpful in this investigation.

Overall, the present disclosure has shown improvement over standard semi-supervised learning. Spatial or spectral-spatial results by all methods produced better results than spectral features. The results also suggest that domain adaptation is more relevant to spatial features. This is intuitive in the sense that the data shifts are more pronounced in spatial distribution than spectral. However, this needs to be further investigated for moderate resolution (30 m) imagery as well. Though the present disclosure was evaluated performance on the hyperspectral data, the method is generic and is applicable to multispectral or RGB images as well.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of generating the domain aware semi-supervised learning. The present disclosure includes a learner that considers the distribution differences in labeled and unlabeled pixels. That is, the distribution shift between the labeled pixels and unlabeled pixels within the image is considered. Thus, the self-training iteration of the conventional approaches were replaced with a single iteration which is enabled with domain adaptation. The model is trained in such a way that it is not only trained on the correct class of pixel but also on the source category of the pixel, for example, labeled pixel or unlabeled pixel. The error in the pixel class is minimized, whereas the error in the source category is encouraged simultaneously. This two way optimization leads to a model which is invariant of the input pixel source category and thus adapts to the domains well.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, via one or more hardware processors, a plurality of pixels associated with a spectral image, wherein the plurality of pixels are one of a) a labeled pixel and b) an unlabeled pixel;

extracting, via the one or more hardware processors, a spectral feature vector corresponding to each of the plurality of pixels using a spectral Deep Neural Network (DNN);

extracting, via the one or more hardware processors, a spatial feature corresponding to each of the plurality of pixels using the spatial DNN, wherein the spatial feature comprises a local neighborhood information associated with a corresponding pixel;

generating, via the one or more hardware processors, a size reduced spatial feature based on the extracted spatial feature using a dimensionality reduction technique;

computing, via the one or more hardware processors, a spatial feature vector based on the size reduced spatial feature using the spatial DNN;

generating, via one or more hardware processors, a combined feature vector by concatenating the spectral feature vector and the spatial feature vector; and generating, via the one or more hardware processors, a domain aware semi-supervised learning model by performing a two way optimization based on the spectral feature vector, the spatial feature vector and the combined feature vector, wherein the two way optimization is performed by:

predicting an optimal class label corresponding to each of the plurality of pixels using a trained fully connected layer, wherein the fully connected layer is trained until a predefined minimum class label error is obtained; and predicting a domain label corresponding to each of the plurality of pixels using a trained Gradient Reversal Layer (GRL) based fully connected layer, wherein the GRL based fully connected layer is trained until a predefined maximum domain label error is obtained, wherein the gradient of the feature vector is reversed before inputting to the fully connected layer.

2. The method of claim 1, wherein the local neighbourhood information is one of a) an image patch and b) a configurable window.

3. The method of claim 1, wherein the domain label indicates one of a) labelled pixel and b) an unlabelled pixel.

4. A system comprising:

at least one memory storing programmed instructions; one or more Input/Output (I/O) interfaces; and one or more hardware processors operatively coupled to the at least one memory, wherein the one or more hardware processors are configured by the programmed instructions to:

receive a plurality of pixels associated with a spectral image, wherein the plurality of pixels are one of a) a labeled pixel and b) an unlabeled pixel;

extract a spectral feature vector corresponding to each of the plurality of pixels using a spectral Deep Neural Network (DNN);

extract a spatial feature corresponding to each of the plurality of pixels using the spatial DNN, wherein the spatial feature comprises a local neighborhood information associated with a corresponding pixel;

generate a size reduced spatial feature based on the extracted spatial feature using a dimensionality reduction technique;

compute a spatial feature vector based on the size reduced spatial feature using the spatial DNN;

generate a combined feature vector by concatenating the spectral feature vector and the spatial feature vector; and generate a domain aware semi-supervised learning model by performing a two way optimization based on the spectral feature vector, the spatial feature vector and the combined feature vector, wherein the two way optimization is performed by:

predicting an optimal class label corresponding to each of the plurality of pixels using a trained fully connected layer, wherein the fully connected layer is trained until a predefined minimum class label error is obtained; and predicting a domain label corresponding to each of the plurality of pixels using a trained Gradient Reversal Layer (GRL) based fully connected layer, wherein the GRL based fully connected layer is trained until a predefined maximum domain label error is obtained, wherein the gradient of the feature vector is reversed before inputting to the fully connected layer.

5. The system of claim 4, wherein the local neighbourhood information is one of a) an image patch and b) a configurable window.

6. The system of claim 4, wherein the domain label indicates one of a) labelled pixel and b) an unlabelled pixel.

7. One or more non-transitory machine-readable information storage mediums comprising one or more instructions which when executed by one or more hardware processors cause:

receiving a plurality of pixels associated with a spectral image, wherein the plurality of pixels are one of a) a labeled pixel and b) an unlabeled pixel;

extracting a spectral feature vector corresponding to each of the plurality of pixels using a spectral Deep Neural Network (DNN);

extracting a spatial feature corresponding to each of the plurality of pixels using the spatial DNN, wherein the spatial feature comprises a local neighborhood information associated with a corresponding pixel;

generating a size reduced spatial feature based on the extracted spatial feature using a dimensionality reduction technique;

computing a spatial feature vector based on the size reduced spatial feature using the spatial DNN;

generating a combined feature vector by concatenating the spectral feature vector and the spatial feature vector; and generating a domain aware semi-supervised learning model by performing a two way optimization based on the spectral feature vector, the spatial feature vector and the combined feature vector, wherein the two way optimization is performed by:

predicting an optimal class label corresponding to each of the plurality of pixels using a trained fully connected layer, wherein the fully connected layer is trained until a predefined minimum class label error is obtained; and predicting a domain label corresponding to each of the plurality of pixels using a trained Gradient Reversal Layer (GRL) based fully connected layer, wherein the GRL based fully connected layer is trained until a predefined maximum domain label error is obtained, wherein the gradient of the feature vector is reversed before inputting to the fully connected layer.

8. The one or more non-transitory machine-readable information storage mediums of claim 7, wherein the local neighbourhood information is one of a) an image patch and b) a configurable window.

9. The one or more non-transitory machine-readable information storage mediums of claim 7, wherein the domain label indicates one of a) labelled pixel and b) an unlabelled pixel.

\* \* \* \* \*